(12) United States Patent
Gvily

(10) Patent No.: US 7,085,994 B2
(45) Date of Patent: Aug. 1, 2006

(54) SNIPPET SELECTION

(75) Inventor: Yaniv Gvily, Morgan Hill, CA (US)

(73) Assignee: SAP Portals, Inc., San Jose, CA (US)

( * ) Notice: Subject to any disclaimer, the term of this patent is extended or adjusted under 35 U.S.C. 154(b) by 740 days.

(21) Appl. No.: 09/862,987

(22) Filed: May 22, 2001

(65) Prior Publication Data

US 2002/0005867 A1    Jan. 17, 2002

Related U.S. Application Data

(63) Continuation-in-part of application No. 09/797,318, filed on Mar. 1, 2001.

(60) Provisional application No. 60/240,032, filed on Oct. 12, 2000, provisional application No. 60/210,861, filed on Jun. 9, 2000, provisional application No. 60/206,764, filed on May 22, 2000.

(51) Int. Cl.
*G06F 17/00* (2006.01)
*G06F 17/21* (2006.01)
*G06F 3/00* (2006.01)
*G06F 17/24* (2006.01)

(52) U.S. Cl. .................. 715/500.1; 715/513; 715/514; 715/764; 715/833

(58) Field of Classification Search ............. 715/500.1, 715/513, 974; 345/832, 833, 835, 853, 760
See application file for complete search history.

(56) References Cited

U.S. PATENT DOCUMENTS

| | | | | |
|---|---|---|---|---|
| 5,629,846 | A | * 5/1997 | Crapo | 708/705 |
| 5,724,595 | A | 3/1998 | Gentner | |
| 5,748,512 | A | * 5/1998 | Vargas | 708/142 |
| 5,877,758 | A | * 3/1999 | Seybold | 715/866 |
| 5,890,170 | A | 3/1999 | Sidana | |
| 5,953,731 | A | 9/1999 | Glaser | |

(Continued)

OTHER PUBLICATIONS

W3C's, "HTML 4.0 Specification: Chapter 18: Scripts," Apr. 24, 1998, http://www.w3.org/TR/1998/REC-html40-19980424/interact/scripts.html, pp. 1-9).*

(Continued)

*Primary Examiner*—Stephen Hong
*Assistant Examiner*—Adam L. Basehoar
(74) *Attorney, Agent, or Firm*—Townsend and Townsend and Crew LLP

(57) ABSTRACT

According to the invention, a process for selecting hierarchical information with a computer system user interface is disclosed. In one step, selection of an element in a hierarchy is recognized. A plurality of ancestor elements is determined for the element. A selection control allows selecting at least one of the plurality of ancestor elements hierarchically-related to the element. Manipulation of the selection control is recognized to select a unit that includes at least two of the plurality of ancestor elements and the element.

28 Claims, 13 Drawing Sheets

U.S. PATENT DOCUMENTS

| | | | | |
|---|---|---|---|---|
| 5,978,842 | A * | 11/1999 | Noble et al. | 709/218 |
| 5,983,268 | A * | 11/1999 | Freivald et al. | 709/218 |
| 6,278,448 | B1 * | 8/2001 | Brown et al. | 345/866 |
| 6,538,673 | B1 * | 3/2003 | Maslov | 345/853 |
| 6,738,804 | B1 * | 5/2004 | Lo | 709/219 |
| 6,750,889 | B1 * | 6/2004 | Livingston | 715/833 |
| 2004/0019611 | A1 * | 1/2004 | Pearse et al. | 707/104.1 |
| 2005/0091186 | A1 * | 4/2005 | Elish | 707/1 |

OTHER PUBLICATIONS

*Streamlining Business with Meta Applications*; An Octopus Whitepaper; Apr. 2001.

*The Octopus Platform*; © 2000-2001 Octopus Software, Inc.

*Octopus Customer Portal Application*; © 2000-2001 Octopus Software, Inc.

*Multiplying Enterprise Application ROI*; An Octopus Whitepaper; Apr. 2001.

Octopus, Inc.—Press Release; Apr. 26, 2000; http://www.octopus.com/news/press/042600.htm.

Octopus, Inc.—Press Release; May 3, 2000; http://www.octopus.com/news/press/050300.htm.

Octopus, Inc.—Press Release; May 11, 2000; http://www.octopus.com/news/press/051100.htm.

Octopus, Inc.—Press Release; Feb. 1, 2000; http://www.octopus.com/news/press/020100.htm.

Octopus, Inc.—Press Release; Jan. 25, 2000; http://www.octopus.com/news/press/012500.htm.

McDonald, Glenn; *The Web as Palette*; Business 2.0; Mar. 1, 2000.

Todays News; *Octopus.com Named Among Red Herring's 'Top 50 Private Companies' for 2000*; May 3.

Spring, Tom; *Portals Get Really Personal*; PCWorld.com; Apr. 2, 2000.

Poletti, Therese; *Startup to Launch Personal Portals*; Mar. 12, 2000; http://www.zdnet.com/zdnn.

*OnePage.com Unveils Breakthrough Platform to Collect and Organize Web Content*; Mar. 13, 2000; http://www.onepage.com/press/press 031300.html.

\* cited by examiner

SNIPPET SELECTION

This application claims the benefit of U.S. Provisional Patent No. 60/206,764 filed on May 22, 2000; U.S. Provisional Patent No. 60/210,861 filed on Jun. 9, 2000; U.S. Provisional Patent No. 60/240,032 filed Oct. 12, 2000; and U.S. patent Ser. No. 09/797,318 filed on Mar. 1, 2001.

BACKGROUND OF THE INVENTION

This invention relates in general to computer user interfaces and, more specifically, to user interfaces for selecting information.

The explosion of information availability is well documented. With so much information available, and at a low cost, the real value an entity seeking information receives is in being able to filter large amounts of information to bring to the forefront specific bits of information of interest to the entity. For example, a user of a hypertext browsing system might find portions of web pages from a number of different web sites. The user may want to aggregate the portions of web paged from the different web sites into a single web page such that browsing the separate sites is not necessary. In another example, the user may find a database of all major movies made, but is interested in only a small number of movies. The user would not be interested in being notified of all movies being made, but only of those movies being made that are of interest to that user.

The most ubiquitous hypertext system available today is the Internet, a global internetwork of networks, that supports various packet communication protocols, such as TCP/IP (Transport Control Protocol/Internet Protocol) that carry higher level protocols, such as HTTP (HyperText Transport Protocol) to transmit HTML (HyperText Markup Language) documents between an HTTP server and an HTTP client, as well as handling other HTTP client-server communications tasks. In a common operation, an HTTP client presents a user with an HTML page containing hypertext links to other HTML pages and the user might select one of the links and be presented with a second HTML page that is referenced by the hypertext link. Such links are referred to as "Uniform Resource Locators" or "URLs", and the act of displaying and clicking links is often referred to as "browsing". Consequently, an interactive HTTP client that displays hypertext pages and retrieves pages using URLs is often referred to as a "browser".

The links between interrelated hypertext pages form a web and the set of interrelated hypertext pages hosted on Internet servers is typically referred to as the "World Wide Web", "WWW" or just "the Web". Consequently, a browser that is used to browse the Web is often referred to has a "Web browser". Herein, "Web site" refers to a collection of hypertext pages, typically assembled and controlled by one entity or a set of related entities. A "Web server" is a server that responds to requests from a Web browser or compatible client. Requests to a Web server are often in the form of HTTP requests, but might include other types of requests.

A portal operator might set up an HTTP server or HTTP server farm (the "portal server") to serve requests from clients seeking information provided by the portal operators. The HTTP server is often referred to as the portal operator's "website" because a browser (or other HTTP client) appears to "go" to a new location in the Web when the URL for the portal operator's HTTP server is specified. Thus, the act referred to as "going to a website" does not involve any movement per se, other than a change of focus of the HTTP client and a display of the HTML code representing that website.

The portal operator might maintain a set of preferences at the portal server for each user that has set up an account with the portal operator. Thus, if the portal provider allows the user to select or deselect categories of information, such as stock quotes, news and weather, a user that is not interested in the weather could set preferences to indicate that when that user requests a portal page from the portal server and the portal server has identified the user, the portal server should serve an HTML page that contains current stock quotes and news, but not weather. Since the page served by the portal server is customized to the user when the portal server has identified the user, the page served is often referred to as that user's portal page.

Portal servers allow for user customization based on preferences, but the typical portal operator only allows a user to build the user's portal page from components ("snippets") made available by that portal operator. Furthermore, the data used to populate the snippets is typically limited to the data ("content") the portal operator makes available. For example, a user might set up the user's portal page to show the weather in San Francisco and Dallas and the news related to baseball, if the portal operator provided a weather snippet and a sports news snippet. The values for the weather data and the news items presented in those snippets are the values and items provided by that portal operator.

Because each portal operator has snippets and content that is specific to that portal operator, many users maintain several portal pages at several portal websites. Thus, a single user might have dozens of customized portal pages on dozens of different portal websites, even though the user is only interested in selected content from each of those portal websites.

While most portal operators are aggressively expanding their repository of snippets, the user is still limited only to those snippets that were pre-designed by the portal operator. An example of this is shown in FIG. 1, which is a screen capture illustrating a typical process of snippet selection for a portal page. As shown there, pre-designed content is organized into topic groups shown on the left of the display. In that display, the "News" topic is highlighted and a list of news snippets is listed to the right of the display. The user can check (or uncheck) snippets to be included (or excluded) from the user's portal page, but the user is generally limited to the list of snippets provided by the portal operator.

Some portal operators use streams of information in a data format known as "XML data streams" (eXtensible Markup Language), often provided by vendors whose product is a supply of information in XML data stream form. Even with XML data streams, the user's portal page will be limited to the streams and content that the one portal operator has pre-designed for portal pages. Furthermore, the typical user either cannot turn an XML data stream into presentable form, such as an HTML page, or does not want to bother with the effort. More often, the XML data streams are fed to the computing infrastructure of the portal operator and from there are converted into presentable HTML format and made available as snippets to users of that portal operator's service.

In an example of one use of a Web browser, a user might "navigate" the browser to a particular Web page, by providing the Web browser a URL referencing that particular Web page. In some cases, the Web page is static, in that it exists before it is requested and a Web server responds to a request for that static page by just returning a copy of that static page. In other cases, the Web page is dynamic, in that it is created in response to the request and the Web server returns a copy of the dynamic page to the requestor after the page is created or as the page is created. The process of dynamic page creation might depend on the data contained in the URL and/or information the Web server has about the requestor.

Using a Web browser, a user might navigate to a Web site dedicated to movies and check what new movies have come out. To keep up to date, the user would visit the site regularly, checking for new movies, but this requires effort and scheduling, if the user is to keep up to date with developments in more than a few areas.

Some Web site operators have addressed this situation by setting up their servers to notify, often by email, users when some event occurs. For example, one popular Web site sends the user an email when a DVD the user had expressed interest in has been released. Other Web sites might notify the user as a message in their customized portal page for that user. This approach does not address the problem of multiple information sources: the user either has to go to multiple Web sites to look for these alerts or sift through the user's email inbox for them. In the case of email alerts, the user is likely to be added to mailing lists only to be bombarded with marketing information the user does not want to get.

Moreover, the web site operator's ability to check for a condition is limited to the content it (the web site) provides. For example, a DVD commerce site operator cannot alert the user as a stock quote goes up or down such that separate email alerts are needed from the DVD and stock sites. The user notification is also limited to a set of pre-designed conditions. That same DVD commerce site operator might not be able to alert the user in the specific event that a new movie by a certain director has been released, unless that site is set up with those pre-designed conditions. Instead, the user has to select from a pre-designed set of alerts and receive email alerts from many different sites.

As mentioned above, many Web sites already offer notification mechanisms. These notifications are usually based on and related to the Web site's own content. FIG. 2 shows an example from a Web site for an online retailer. A user wanting to buy a certain movie would visit the site and look up the desired movie. If the site responds that the title is unavailable or not yet released, the site then offers the user a chance to sign up for a notification service, where the user gives an email address to which the notification is sent. The Web site server would then add the user's email address to a database and the server includes programs that will notify users when events occur, such as the availability of the desired movie for purchase.

FIG. 3 shows another example from an investment site. The site lets the user set complex alerts based the user's portfolio. The user is again limited to a pre-designed, albeit customizable and quite extensive, set of conditions for a specific field of interest, which in this case is stock quotes. The user is not able to aggregate alerts from multiple sites in one place.

BRIEF DESCRIPTION OF THE DRAWINGS

The present invention is described in conjunction with the appended figures.

DESCRIPTION OF THE SPECIFIC EMBODIMENTS

A few examples of specific embodiments of a hypertext browsing and serving system according to the present invention are described herein. Others may become apparent after reading this description and it should be understood that the invention is not limited to these specific examples, but is limited only by the appended claims. Furthermore, while specific methods and apparatus are shown, it should be apparent upon reading this disclosure that some of the methods can be practiced using different apparatus and the apparatus shown could be used to perform different methods than shown.

This description discloses how to make and use several embodiments of a system according to the present invention, but for brevity omits descriptions of many well-known components of such systems. For example, the operation and design of a network capable of carrying hypertext traffic, such as the Internet, the specifications of hypertext protocols, such as HTTP, for use in transporting HTML pages, the construction of a browser with plug-in extensibility, such as Netscape's Navigator™ browser, are not disclosed herein, since they are well described in countless readily available sources.

Using aspects of the present invention, a browser user can select portions or all of an HTML page being browsed and construct a portal snippet from the selection. The portal snippet is typically stored as a preference for that user, so that the user's custom portal page includes the content and layout of the portal snippet. It is then saved as part of the user settings for the portal. The next time the user's home page is opened, that snippet is there for viewing. Further, the user can define a test to perform against a snippet to provide notification of when a defined change in the snippet occurs. In some embodiments, the selection process can be generalized to allow selection of any hierarchical information.

The user interface (UI) selection controls described below can be implemented as an ActiveX™ control, a Java™ control, an applet, or a browser plug-in, a separate software application, etc. and can be used to navigate logical units of a document object model (DOM) of an HTML page being displayed by a browser. The DOM is a hierarchical, tree-like, structure that represents the HTML code. Further, other embodiments could use the selection controls to navigate any type of hierarchical information, for example, a program listing, an XML file, an HTML file, a tree chart, an organization chart, a table, etc.

Figure 1:
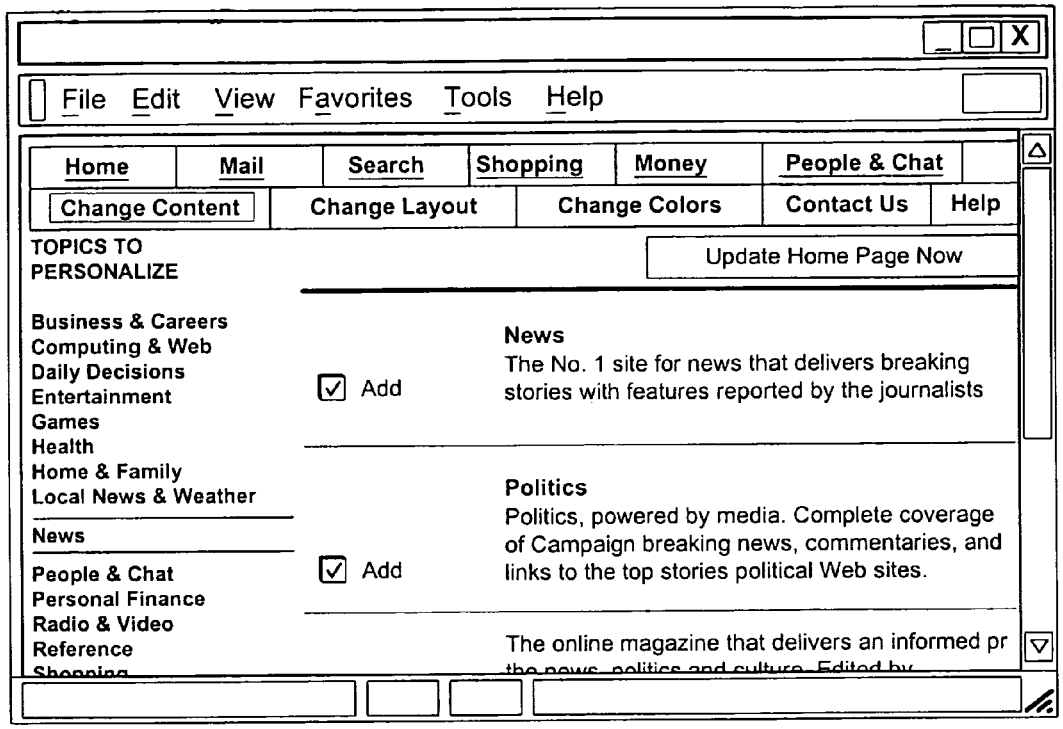
FIG. 1 is a screen shot of the browser displaying a process of selecting pre-designed snippets from a conventional portal site.
Figure 2:
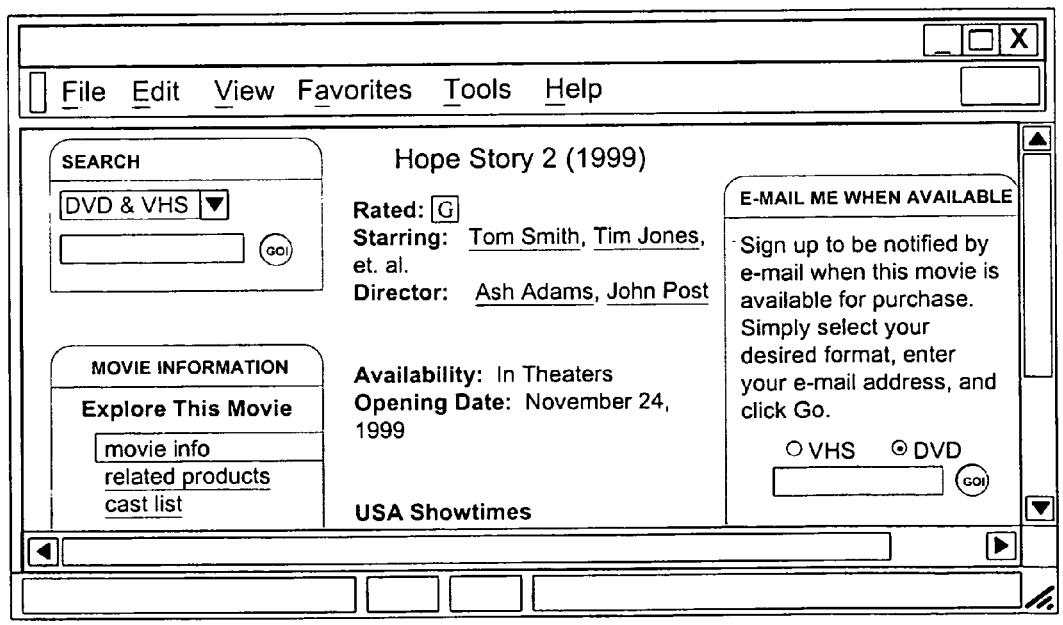
FIG. 2 is a screen shot of a prior art commerce web site.
Figure 3:
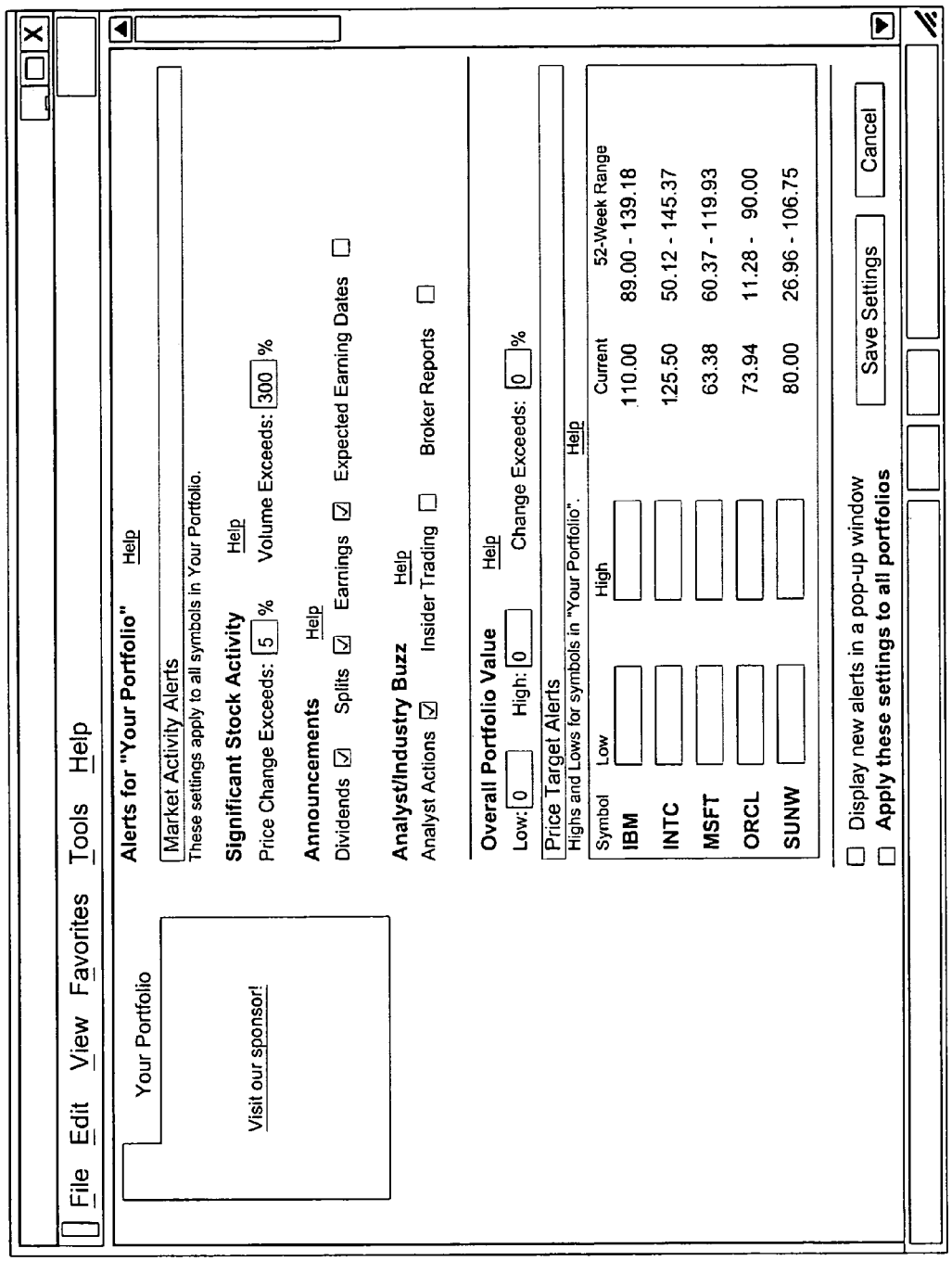
FIG. 3 is a screen shot of a prior art investment web site.
Figure 4A:
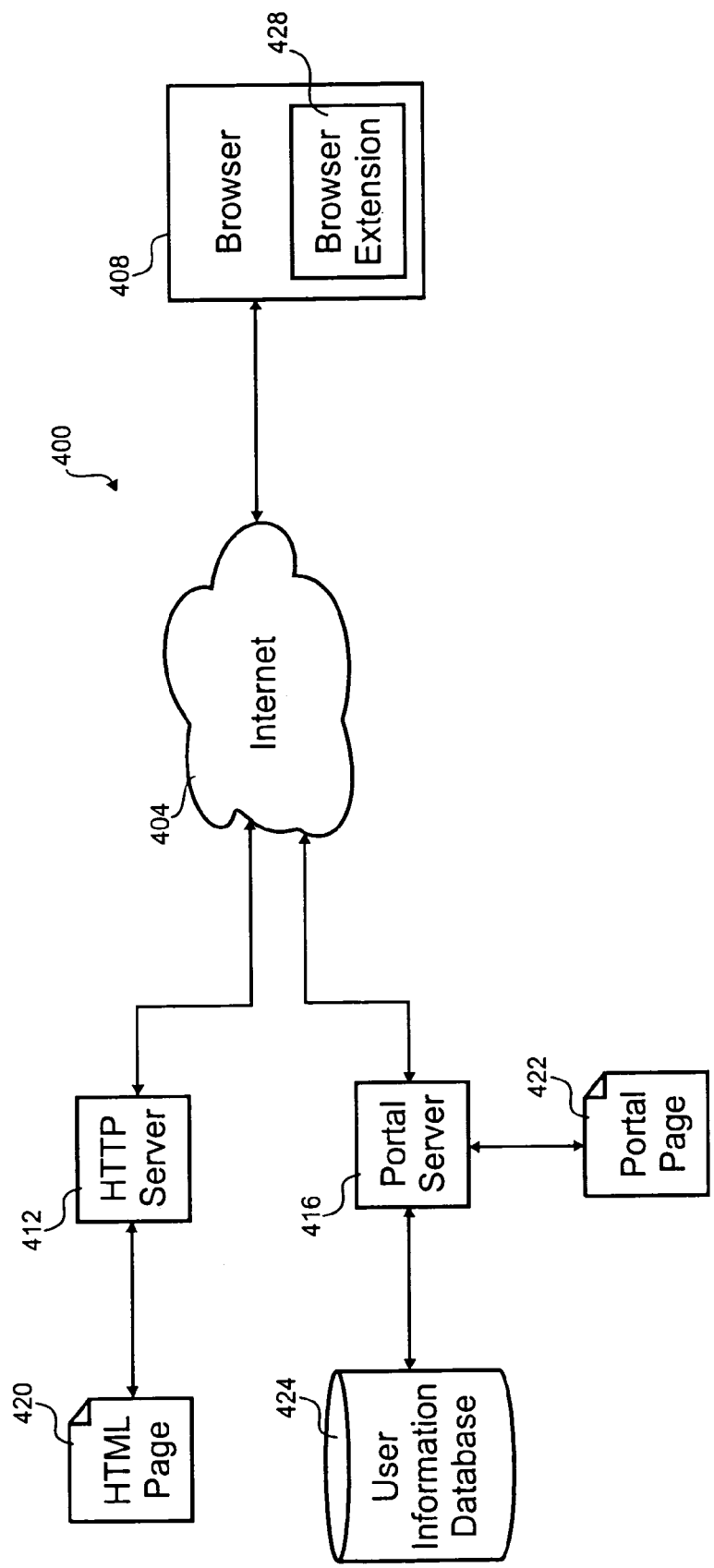
FIG. 4a is a block diagram of an embodiment of a hypertext client-server system in which a snippet capable browser might be used.

Referring now to the figures, FIG. 4a is a block diagram of a hypertext client-server system 400 in which a snippet-capable browser 408 might be used. This embodiment 400 allows selecting snippets during the normal browsing process. That is to say, the user brings up any HTML page 420 and selects a snippet with help from a UI control in a browser extension 428 without modification of the way the HTML page 420 is displayed in a browser 408.

The browser 408 associated with the user downloads the HTML page 420 retrieved from an HTTP server 412. The browser 408 could be Netscape Navigator™, Microsoft Explorer™, a WAP enabled phone or PDA, or any other viewer that displays hierarchical content. In this embodiment, the HTTP server 412 is separated from the browser 408 by the Internet 404, but any network could be used in place of the Internet 404. A browser extension 428 loaded into the browser 408 extends the functionality to include a selection control. Although this embodiment uses a browser plug-in as the extension 428, other embodiments could use an ActiveX™ or a Java™ control to add the selection control. Further, some embodiments could add the UI selection control directly into the browser 408.

The selection control is manipulated by the user to select snippets from the HTML page 420. The snippet is added to the portal page 422 associated with a portal server 416. The selected snippets and other configuration information for each user are stored in a user information database 424. After login to the portal server 416, the browser 408 is redirected to the portal page 422 uniquely tailored for that user. The tailoring is provided by the preferences, snippets and alerts stored in the user information database 424.

The browser extension 428 interfaces with the portal server 416 to provide snippet selection and any triggering events for a selected snippet. All this snippet selection information is stored in the user information database 424 for retrieval when producing the portal page 422.

Figure 4B:
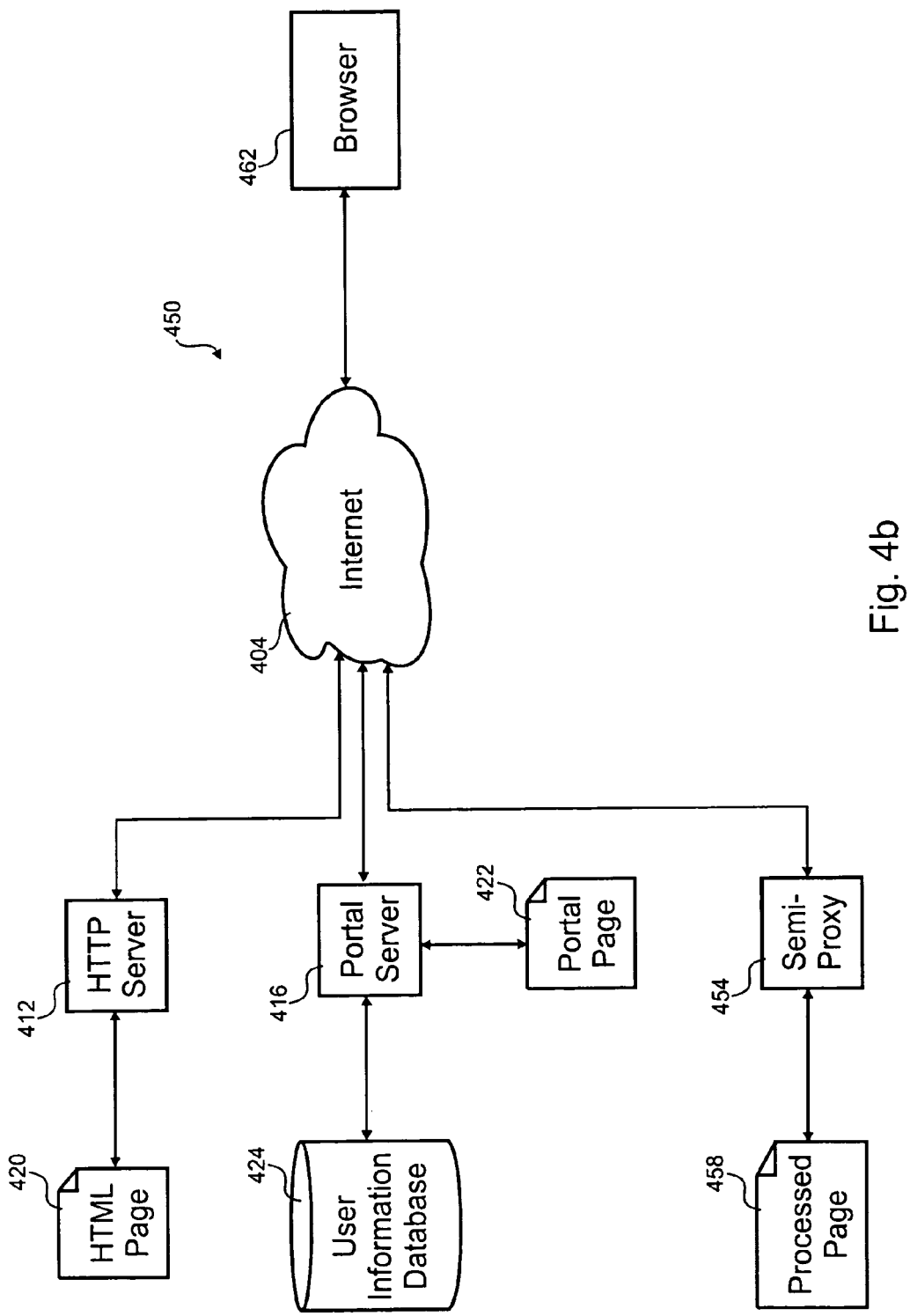
FIG. 4b is a block diagram of another embodiment of a hypertext client-server system in which a standard browser is used.

With reference to FIG. 4b, a block diagram of another embodiment of a hypertext client-server system 450 is shown. In this embodiment, no modification to the browser 462 is needed to allow selecting snippets from the HTML page 420. The user points the browser 462 to the portal page 422 and indicates to the portal server 416 the desire to add a snippet to the portal page 422. The portal server 416 presents the user with an entry line such that the user can enter the URL of the HTML page 420 that contains the snippet.

The browser 462 is redirected to the semi-proxy server 454 where the HTML page 420 is analyzed and manipulated to insert scripts and other information into the HTML page 420 to create a processed page 458. For example, the HTML page 420 is analyzed to determine the snippets that are likely to be desired by the user. This analysis involves analysis of the DOM tree for the HTML page 420 to determine probable snippet areas. Once these areas are known, the active elements in the HTML page 420, such as links, control boxes, and data input forms, are inactivated or removed such that the processed page 458 is visibly the same, but does not function as originally designed. Scripts are added to the processed page 458 that are associated with the different areas of the HTML page 420 that are probable snippets.

The user can select one or more areas of the processed page 458 as snippets to become part of the portal page 422. Dragging the cursor over one or more areas can select those areas as a snippet. By selecting an area of the processed page 458, the scripts communicate back to the portal server 416 what snippets are selected. Another web page confirms the selection before entering the selection into the user information database 424 such that it appears in the next refresh of the portal page 422.

In another embodiment, the control provided by the browser extension 428 in the embodiment of FIG. 4a is achieved by adding a selection script to the processed page 458 after all the active elements of the source HTML page 420 are disabled. In this embodiment, the probable snippets are not determined because the user can use a UI selection control provided by the selection script to select any portion of the processed page 458 desired for the snippet. Once the user makes the selection, the selection script communicates the selection back to the portal server 416 for display in the next refresh of the portal page 422. The selection script provides a selection control, as described more fully below, that allows easily selecting a user-determined area of the processed page 458 without the need for an ActiveX™ control, a Java™ control, an applet, or a browser plug-in, or a separate software application to provide the selection control.

Figure 4C:
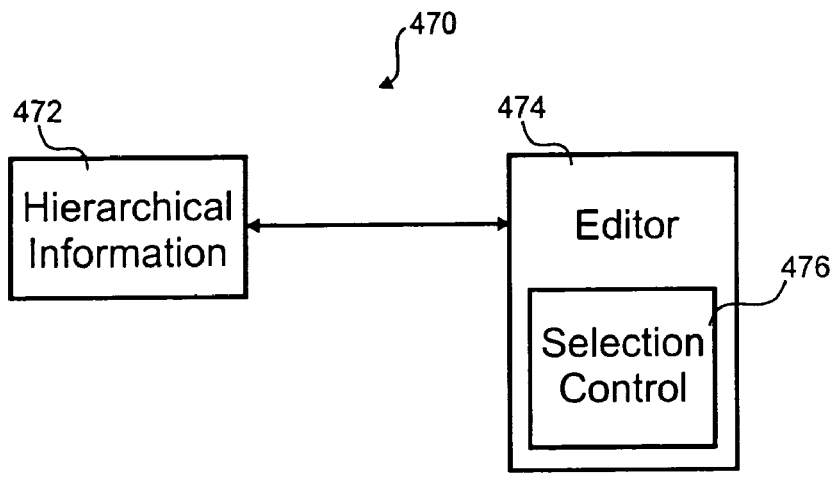
FIG. 4c is a block diagram of an embodiment of an editing system that uses a selection control integral to an editor.

Referring next to FIG. 4c, a block diagram of an embodiment of an editing system 470 that uses a selection control 476 integral to an editor 474 is shown. The embodiment of FIG. 4a uses a browser extension 428 to provide the selection control that is similar to the selection control of the present embodiment. In this embodiment, the editor 474 uses a selection control 476 to allow selection of hierarchical information 472 more easily for any purpose, which could include selecting a snippet. The selection control 476 is integrated into the editor 474 to select the hierarchical information 472 in the file being edited. The operation of the selection control 476 is described in more detail below.

Figure 4D:
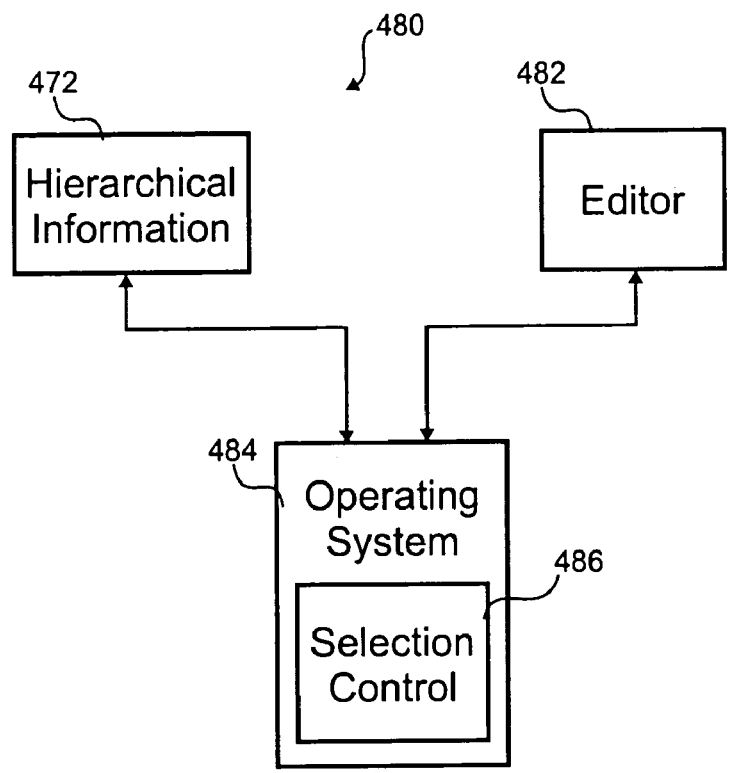
FIG. 4d is a block diagram of another embodiment of an editing system that uses a selection control integral to an operating system to allow any program to use the control.

With reference to FIG. 4d, a block diagram of another embodiment of an editing system 470 is shown that uses a selection control 486 integral to an operating system (OS)

484 to allow any program running the OS to use the control. This embodiment has the selection control 486 included as part of the operating system 484 such that any program, e.g., such as the editor 482, can use the selection control to select the hierarchical information 472. For example, a drawing program could use the selection control to highlight a portion of an organization chart being edited.

Figure 5:
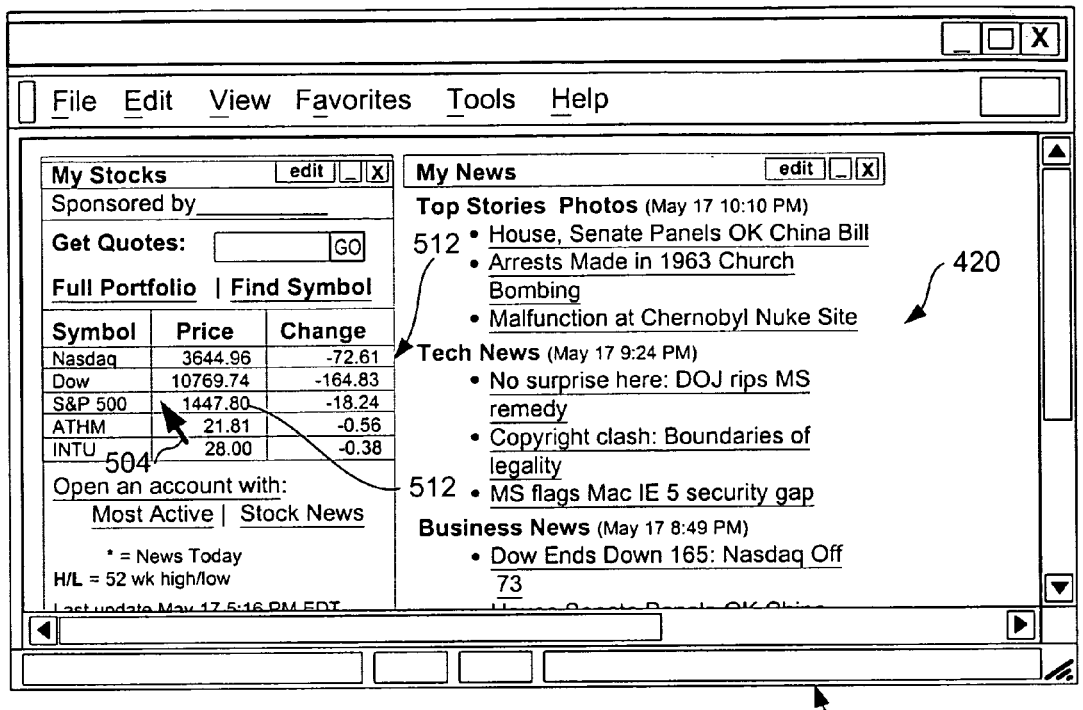
FIG. 5 is a screen shot of a web page from which a portal snippet is to be created.

FIGS. 5–9 illustrate an embodiment of a process for generating portal snippets and displaying portal snippets as a portal page 422 that is customized for a user. Referring first to FIG. 5, which illustrates an HTML page 420 that is displayed by the browser 408 and will be the source for the portal snippet. While viewing the page 420, the user can simply indicate the start of a selection process. One method of indicating such a start is for the user to right-click (i.e., click on the right-hand button on the pointing device to indicate a request for context-sensitive action). In the example shown, the user starts the selection process when the cursor 504 is on a particular element 508 in a table 512 and a right-click is performed. It is noted that the HTML page 420 serving as the snippet source can be any HTML page and is manipulated in the normal course of browsing.

Figure 6:
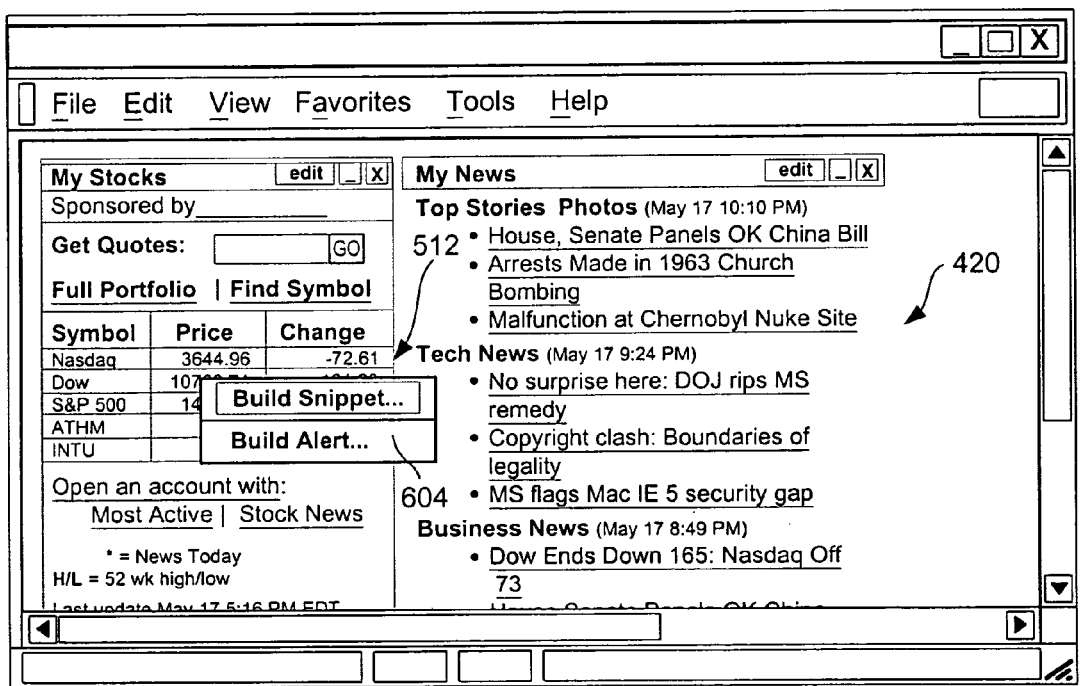
FIG. 6 is a screen shot illustrating an embodiment of a process a portal page user uses to create a portal snippet.

As shown in FIG. 6, the browser extension 428 presents the user with the option to build a portal snippet from the displayed context-sensitive pop-up menu 604 activated with a right-click. When the user opts to build a portal snippet using the context-sensitive menu 604, the browser extension 428 presents the user with a selection control 704 shown in FIG. 7 and highlights the smallest logical unit of the HTML page 420 that is under the cursor 504. In this case, a single table cell or element 508 initially defines a selection area 712 or logical unit. As shown in FIG. 8, when the user moves the slider 708 up, a larger and larger selection area 712 of the HTML page 420 is chosen (and indicated as being selected by different shading that is shown in the figures by an enclosing rectangle, for clarity). Each ancestor element of the hierarchy has a label 716 derived from the HTML code. The ancestor elements defined on the control 704 correspond to ancestor elements in the hierarchy from HTML. For example, the selected element in lowest level could be a character, with the next-higher ancestor element being a cell, with the next-higher ancestor element being a row, etc. until the whole HTML page 420 is selected.

Selection of an ancestor element with the slider 708 adds all descendent elements below the ancestor element to the selected functional unit. For example, the initially selected element could be a cell. By moving the slider 708 up to the row ancestor element would increase the selected area to include the initially selected element to the functional unit along with any other cells in the row of the ancestor element.

Figure 9:
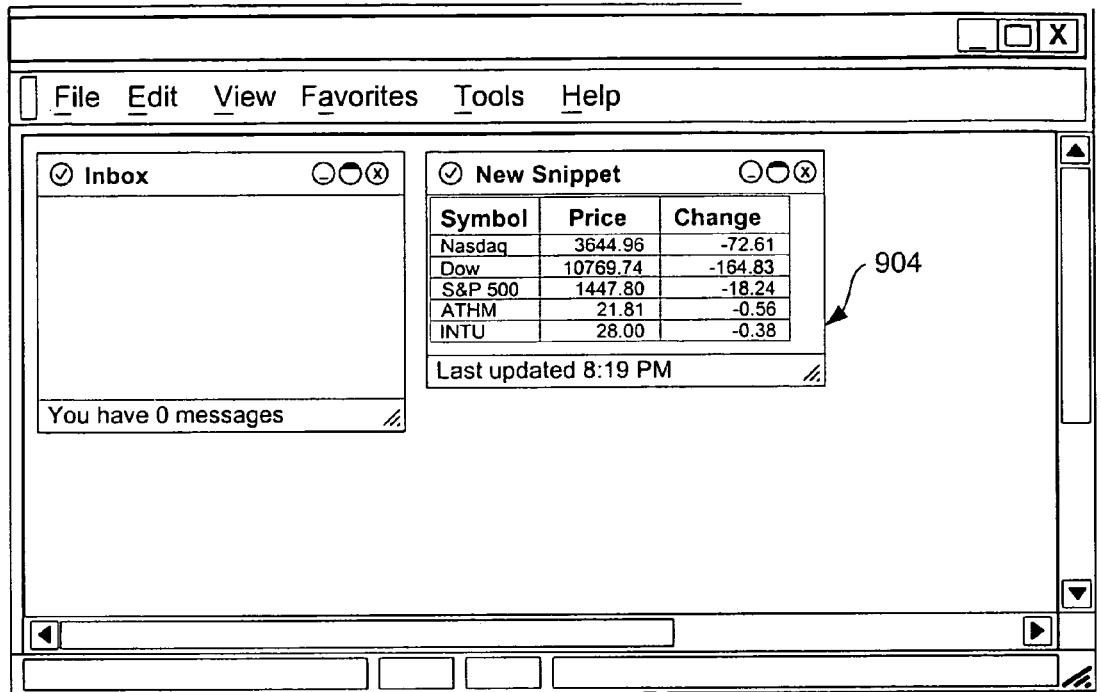
FIG. 9 is a screen shot of the browser with snippet capability displaying the user's custom portal page including the snippet selected in FIG. 8.

FIG. 9 shows an embodiment of the selected snippet 904 as added to the portal page 422. Once the snippet 904 is selected, as described above, the user is given the opportunity to confirm the selection. Next, that snippet is saved as part of the user's custom portal page 422 (or made available to other users of the portal server 416, as the case may be). Some embodiments, as described further below, allow setting conditions upon a snippet to allow alerts that indicate when the HTML page 420 changes in a way to activate the alert.

Figure 10:
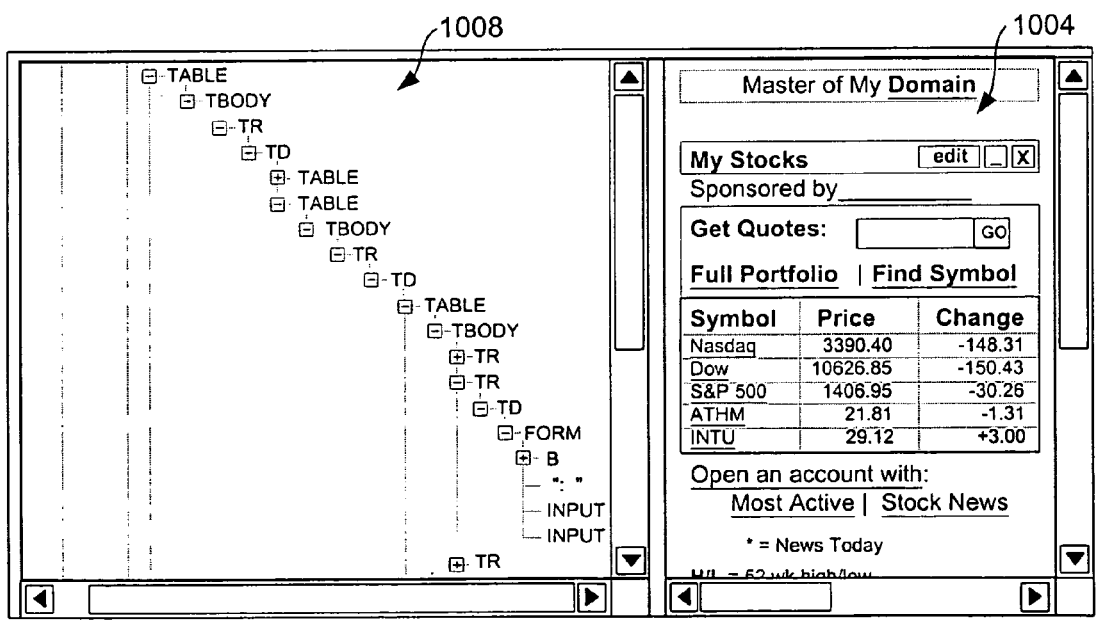
FIG. 10 illustrates a portion of an example complex DOM (Document Object Model) tree for a portion of the HTML page illustrated in FIGS. 5–8.

FIG. 10 illustrates a portion 1008 of an example DOM tree for a snippet 1004 of the HTML page 420 selected in FIGS. 5–8. A typical HTML page 420 contains hundreds of HTML elements resulting in a large DOM hierarchy tree that is difficult at best to navigate by the average user. The DOM tree for this embodiment, which is partially shown in FIG. 10, is so complex that it cannot be viewed in its entirely on the screen shot.

Figure 11:
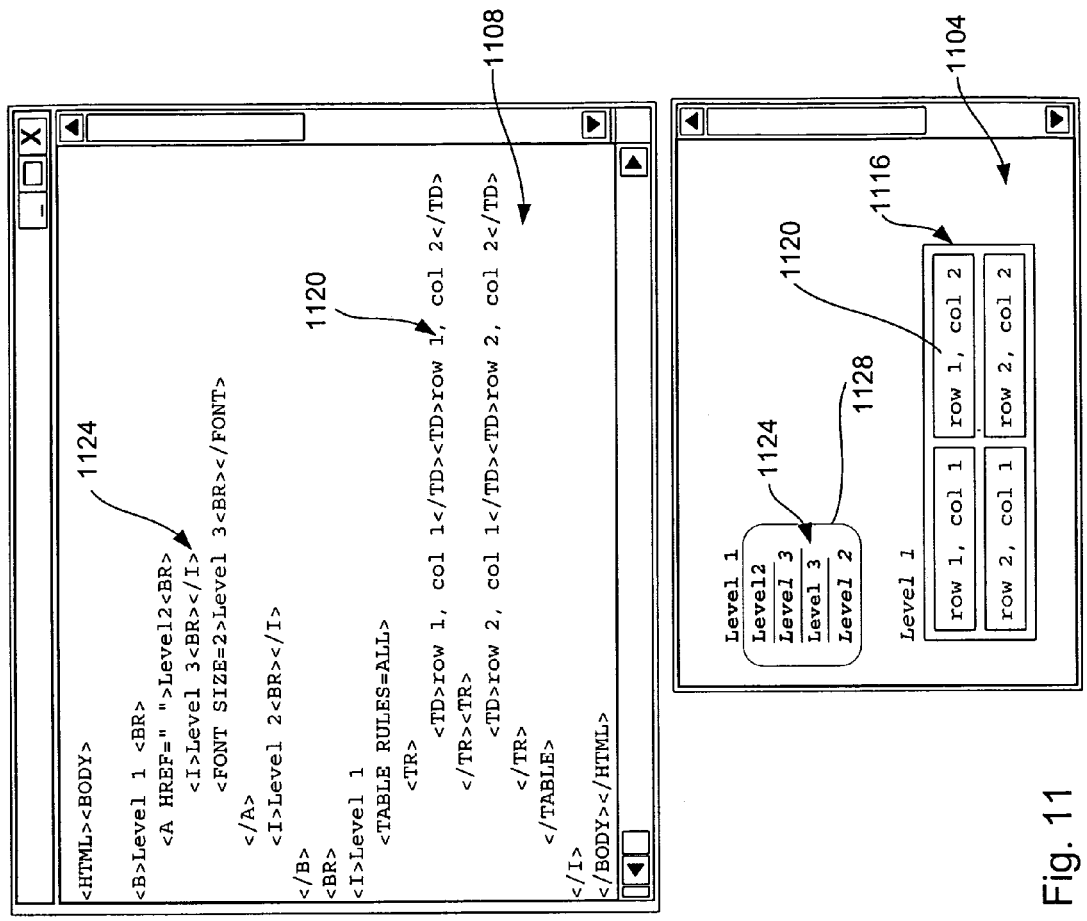
FIG. 11 illustrates a simplified HTML page, its corresponding DOM and HTML code.
Figure 11:
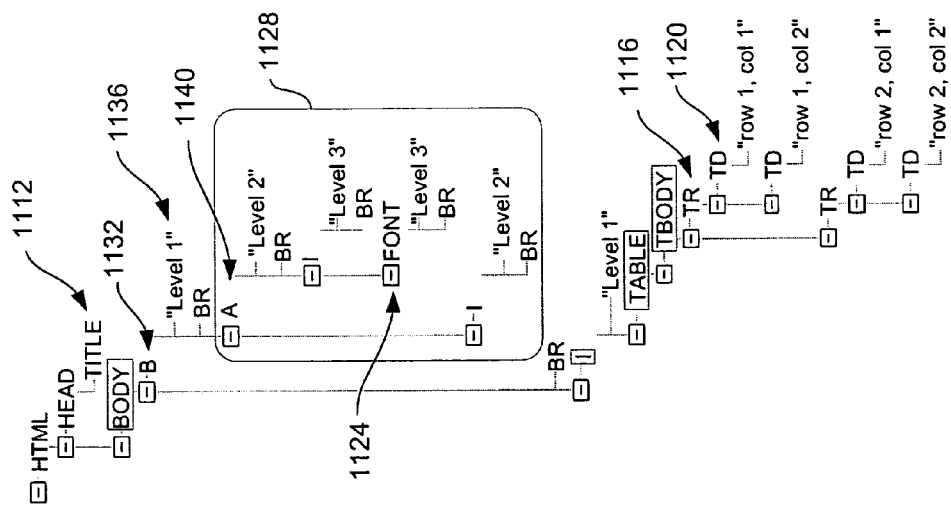

In relation to FIG. 11, a simpler example HTML page 1104 will now be used to illustrate the operation of the selection control 704 introduced above. More specifically, FIG. 11 illustrates a simple HTML page 1104, its corresponding DOM 1112 and HTML code 1108.

In this example, assume the user is interested in selecting the first row 1116 out of a table. Navigating the DOM hierarchy tree 1112 downwards from the root is difficult, since the user would have to start at BODY, then select between branches B or I, the choice of which might not be apparent from the HTML page 1104 as displayed.

Figure 7:
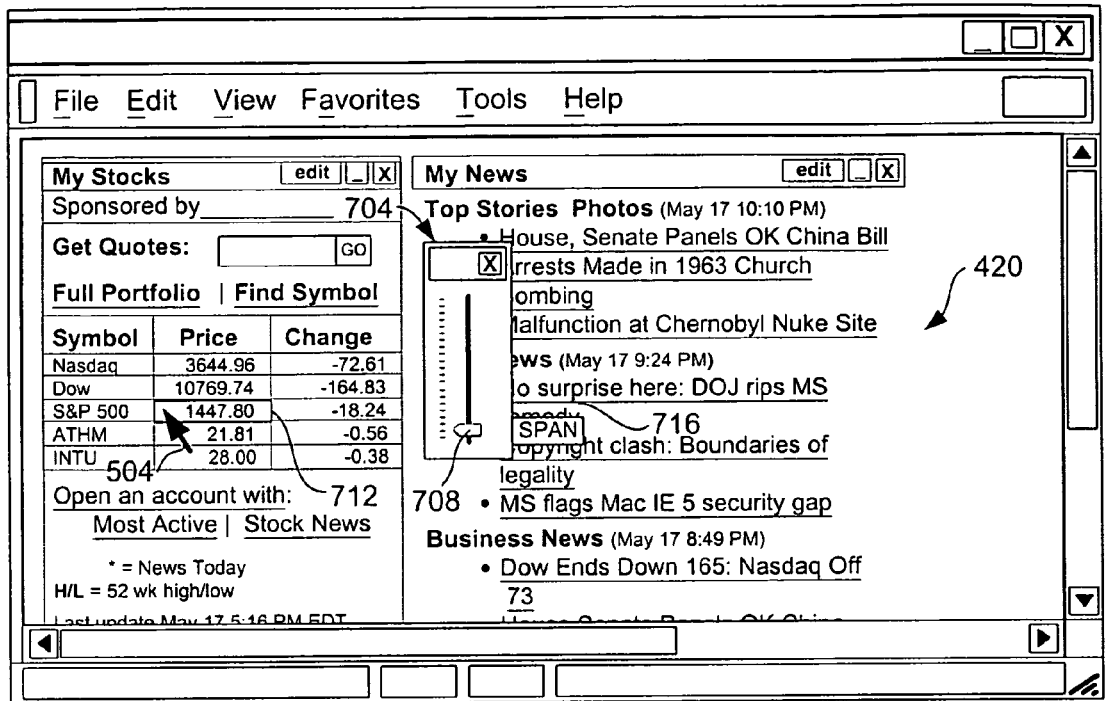
FIG. 7 is a screen shot of a browser with snippet capability as the user is prompted for selection of a logical unit corresponding to the portal snippet, including a slider for navigating a hierarchical tree of an HTML page.
Figure 8:
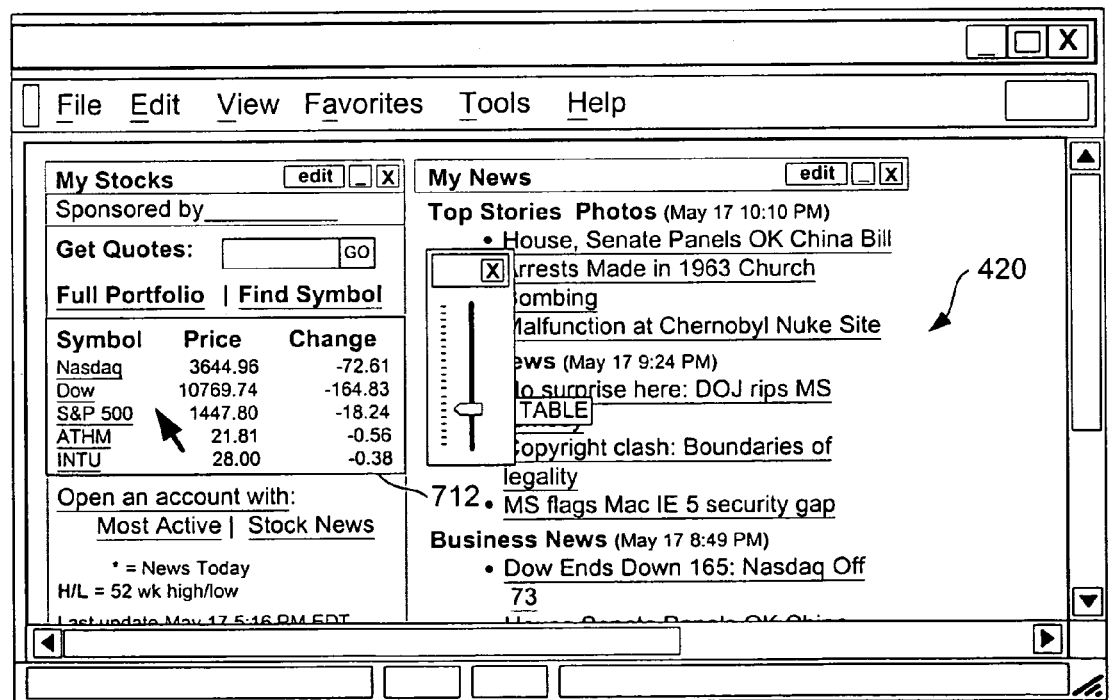
FIG. 8 is a screen shot similar to that of FIG. 7, but illustrating the effect of moving the slider control to select a larger logical unit of the HTML page.
Figure 12:
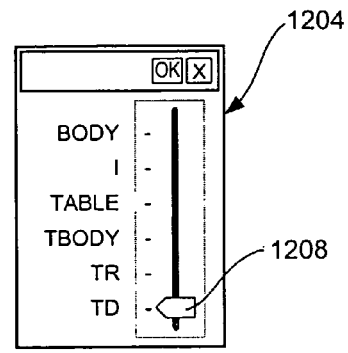
FIG. 12 shows an embodiment of a selection control as it might be used in a browser, editor or OS according to the present invention.

Using the slider illustrated in FIGS. 7–8 and shown out of context in greater detail in FIG. 12, a user can visually select a row of a table with a control 1204 to identify a selected element and a slider 1208 will present the user with the ability to select larger and larger logical units that contain the selected row. As the slider 1208 is moved up, a successively larger area of the screen is selected which corresponds to a successively larger logical unit. The ancestor logical units of the hierarchy are distributed vertically on the control 1204. In this example, "TD" represents the individual table cell data, "TR" represents the row containing the selected cell, "TBODY" represents the table body that contains the row, "TABLE" represents the whole table, "I" represents the HTML element that contains the table and "BODY" represents the entirety of the body of the HTML code 1108. Although the control 1204 of this embodiment is shown with a vertical arrangement, a horizontal arrangement could also be used or any control configuration that has a scale of ancestor elements in different hierarchy levels that are selectable in any way by the user.

Referring back to FIG. 11, the initially selected logical element was the table cell 1120 in the row 1116. Since the columns are nested within the rows, the initial element is the table cell 1120 and not the row 1116. When the initial element is selected, nested elements (smaller logical units) are presumed over ancestor elements, otherwise all selections would default to the top ancestor. Once a selected element is chosen, the browser 408 (or extension 428, as the case may be) builds a list of the ancestor elements for the selected element for presentation on the slider controls. In the example shown in FIG. 11, the selected element 1120 and its ancestor elements are TD, TR 1116, TBODY, TABLE, I and BODY, as shown in FIG. 12 as the different selectable ancestor elements. Once an ancestor element is chosen, all sibling elements for that ancestor element are part of the logical unit and are highlighted on the HTTP page 420. It follows that the logical unit always includes the originally selected element.

Thus, using the slider 1208 the user can "zoom out" from an initial selection element to any of the logical units corresponding to an ancestor element. Due to the hierarchical structure of the DOM, any selection the user makes will include the originally selected element under the cursor 504.

The embodiment of the control 1204 shown in FIG. 12 allows the user to select a larger logical unit that includes ancestor elements of the element under the cursor 504, but does not let the user select multiple elements at the same level (i.e., siblings in the hierarchy), such as the selection of the area corresponding to reference designator 1128 in FIG. 11, which is not entirely contained within one HTML element and its sibling elements. In other words, the selection includes everything below HTML element B 1132 except the Level 1 element 1136. To make such a selection, the user would use the two-dimensional control 1304 shown in FIGS. 13*a*–13*c* or its equivalent. This control 1304 allows selecting ancestor elements as well as neighboring sibling elements in the DOM hierarchy. The two-dimensional control 1304 allows selecting a path through the plurality of sibling elements and plurality of ancestor elements wherein crossed elements and their respective descendent elements are included the selected functional unit.

Figures 13A, 13B, 13C:
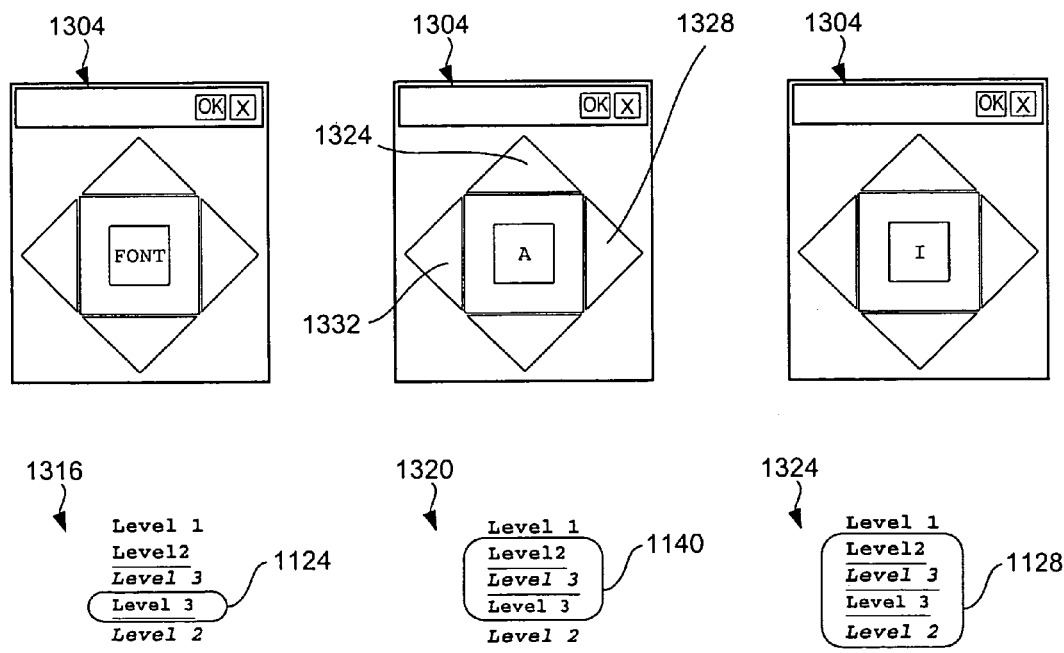
FIGS. 13a–13c show several instances of an embodiment of a selector control for use in two-dimensional selection of both sibling and ancestor elements.

The two-dimensional control 1304 shown in FIGS. 13*a*–13*c* can be used to easily select exactly the elements in large selection area 1128 of FIG. 11. In one step of the process, the user clicks somewhere within the large selection area 1128 of the HTML page 1104, such as a FONT element 1124. The two-dimensional control 1304 then appears, zoomed in on the FONT element 1124 that is highlighted in the HTML page portion 1316 as shown in FIG. 13*a*. The user can then zoom out one level by clicking on the up arrow 1324 to expand selection to include an ancestor element A 1140 in the hierarchy 1112 that results in a larger logical unit 1140 being highlighted as shown in FIG. 13*b*. To extend the selection "sideways" or to a sibling element in the hierarchy 1112, the user selects the right or left arrows 1328, 1332. In the example shown, the user selected the right arrow 1328, resulting in the selection of a large functional unit 1128 shown in FIG. 13*c*. The selection will be highlighted on the original HTML page 1104 in a similar fashion to that depicted in FIG. 8.

Once the user confirms his selection, it is translated into a query that uniquely identifies the snippet 904. The query will usually comprise the URL of the page 420 being viewed and additional information to identify the logical unit selected within that page 420. In one embodiment, the browser extension 428 sends the query to a portal server 416 that stores the query as a new snippet (for that particular user, for any other user or for none at all) in its user information database 424. The next time the user requests the user's custom portal page 422, the user is presented with a page 422 containing the newly selected snippet 904, as illustrated by FIG. 9.

Although the two-dimensional control 1304 shown in FIGS. 13*a*–13*c* allows selecting any path through the elements of the hierarchy, some embodiments could simplify the path to include only selecting sibling elements after the topmost ancestor element is chosen. In this way, the path would go up until the topmost ancestor where the path would veer right or left. As with the above embodiments, any descendent elements of the ancestor elements or sibling elements in chosen path are included in the logical unit.

A method and apparatus for selecting portal snippets and displaying a page built with those portal snippets has now been described. As the above descriptions are examples and the invention is not so limited, it should be understood that other variations are also within the contemplation of the inventor. Merely by way of example, many different user interfaces could be used to specify portal snippets, such as a context menu appearing on a right-click action, a menu selection, a modified click (e.g., with the shift button, or the like), a click on a button in the browser's toolbar, etc. Also, the aggregation and portal snippet creation capability could be provided as part of the browser or as an extension to the browser, such as an ActiveX control hosted by the browser, a host or container of a browser, an integral part of the browser added directly into its code, a plug-in or any other user events capturing component.

Controls for selection of snippets are described above, but other methods and apparatus might be used by the user to select snippets, such as a tree listing all or some elements in hierarchical order of the DOM, a list displaying possible snippets, up and down buttons, etc. A slider control, while physically appealing, can be easily replaced with other controls that offer the same functionality.

Furthermore, although FIG. 4 shows a remote portal server, the portal server need not be remote, as the user's selections might be stored locally, with other settings, on the user's client machine. Any application that allows storing snippet definitions and then produces (or enables producing) a cohesive web page out of them could be considered a portal server.

In another embodiment, a hypertext client-server system 400 that is described below enables a user to create web alerts from an HTML page 420 at any time, such as during random browsing of the web, regardless of whether the HTML page 420 was programmed or designed to enable web alerts. One suitable UI for accepting input from and providing output to the user is shown in FIGS. 14–18.

As illustrated therein, the user selects a snippet 904 of data from an HTML page 420 and in response, the user's client 408 (typically a Web browser, plug-in or associated program) identifies a unique query for finding the selected snippet 904 (i.e., a way to locate the snippet in the future). One such reference is the URL of the page 412 being snipped from combined with data uniquely locating the snippet on that page 412.

The system 400 then creates an alert to be associated with that snippet 904 and prompts the user for additional data for that alert, such as the condition that will fire the alert (e.g., "when basis is greater than 100"), the frequency at which the condition will be tested (e.g., daily, hourly, every minute, etc.), the method of notification (e.g., email, popup window, an entry in the user's portal page's inbox, etc.). This information is stored in the user information database 424.

In one implementation, the user's browser 408 includes an ActiveX control or plug-in to handle the UI. This extension 428 is responsible for identifying the user's request to identify web content (such as selecting the appropriate entry from a popup context menu), displaying the unique UI (described herein) control for the selection, running an identification process and alert customization mentioned above and sending the information about the new alerts to a portal server 416 for storage in the user information database 424.

In one implementation, the selection control 704 for the defining snippets 904 of content from HTML pages 420 is based on the concept of identifying snippets 904 by their location in the DOM of the HTML page 420. The DOM is a hierarchical tree-like structure. The selection control 704 lets the user select any logical unit of elements in that tree, thus in effect selecting the content of all nested elements. The selection process is greatly shortened by focusing the selection control 704 around the initial location of the user's click on the page 420. A slider 708 then enables the user to walk up and down the DOM hierarchy tree from that initial location.

By slightly altering the storage of the snippet 904, it is possible to share alerts among multiple users (e.g., across a group of users or among all users). It is also possible to add the alert to the database 424 without immediately adding it to any of the users' portal pages 422. This capability is aligned with the role of the portal administrator or designer. The administrator would then be able to easily author alerts and broadcast them to select users without the need for special design tools.

Figure 14:
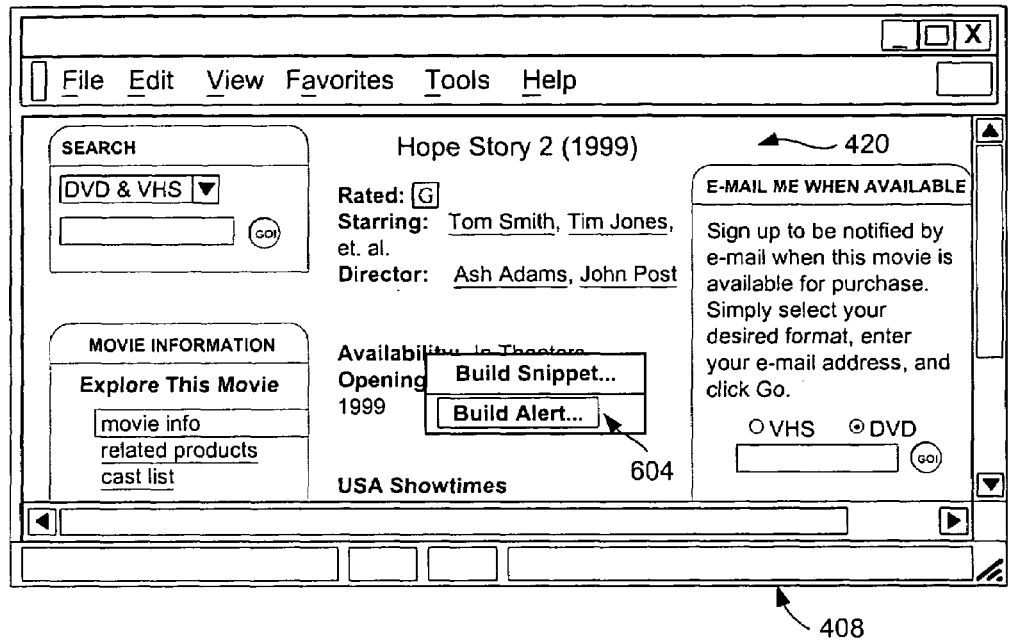
FIG. 14 is a screen shot of that shows an embodiment of a menu used in formulating an alert.
Figure 15:
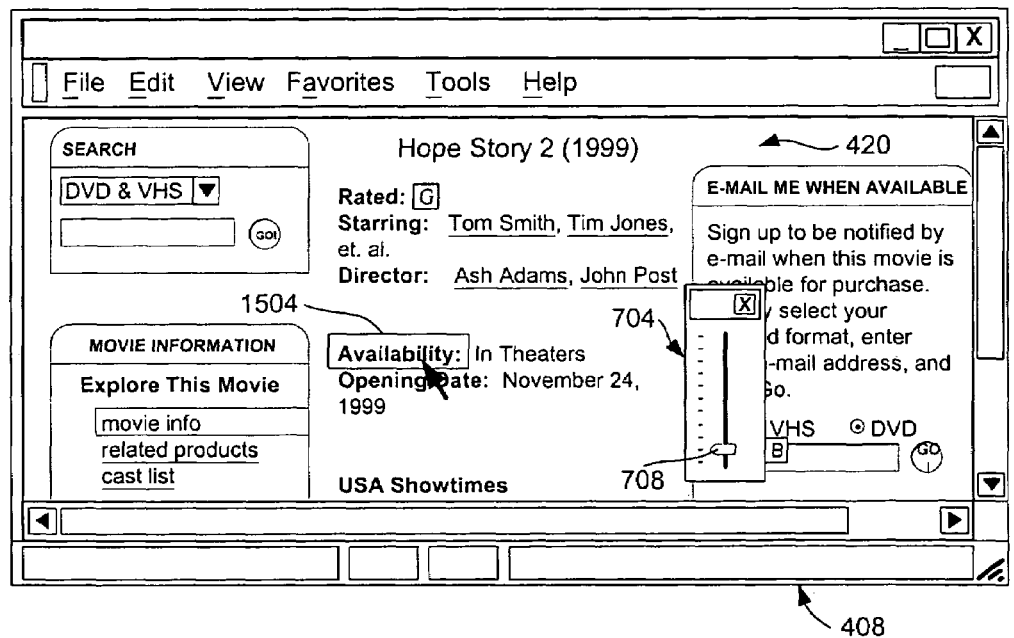
FIG. 15 is a screen shot that shows an example of a selected logical unit and a selection control.
Figure 16:
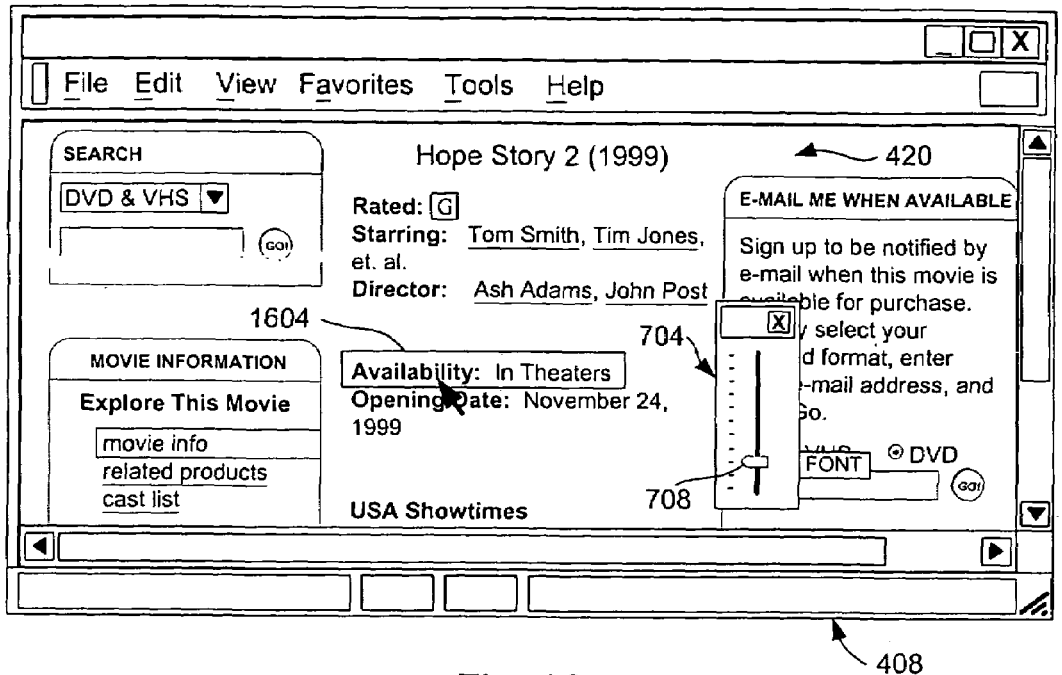
FIG. 16 is a screen shot that shows an example of a larger selected logical unit achieved by adjusting the slider in the control.

The selection process of an alert is similar to the selection process of a snippet 904. With reference to FIG. 14, the user right-clicks on the logical element of interest choosing to create an alert from the context-sensitive pop-up menu 604. A control 704 opens with the initial selection 1504 highlighted as shown in FIG. 15. The user then zooms out by moving the slider 708 up a notch or level so that it encompasses the desired section 1604 of the HTML page 420 as shown in FIG. 16. Depending on the initial logical element selected, the selection control 704 may allow selection of ancestor elements above or descendent elements below the level of the logical element.

Figure 17A:
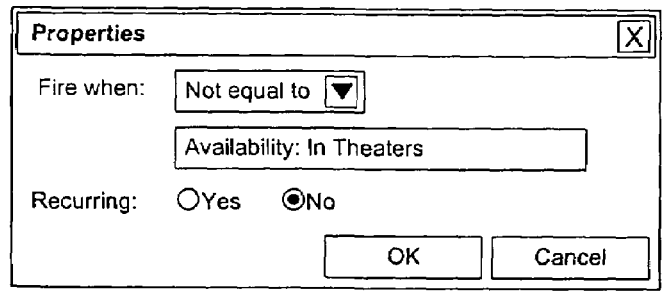
FIG. 17a is a screen shot of an embodiment of a dialog box that allows setting a triggering condition for an alert.
Figure 17B:
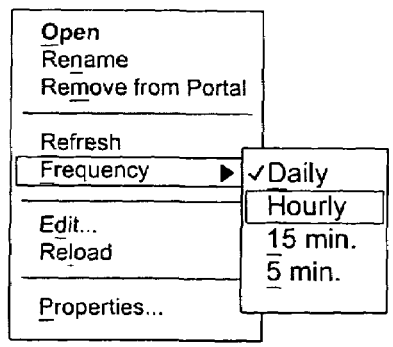
FIG. 17b is a screen shot of an embodiment of a context-sensitive menu that allows setting a frequency at which the HTML page is checked for the triggering condition.
Figure 18:
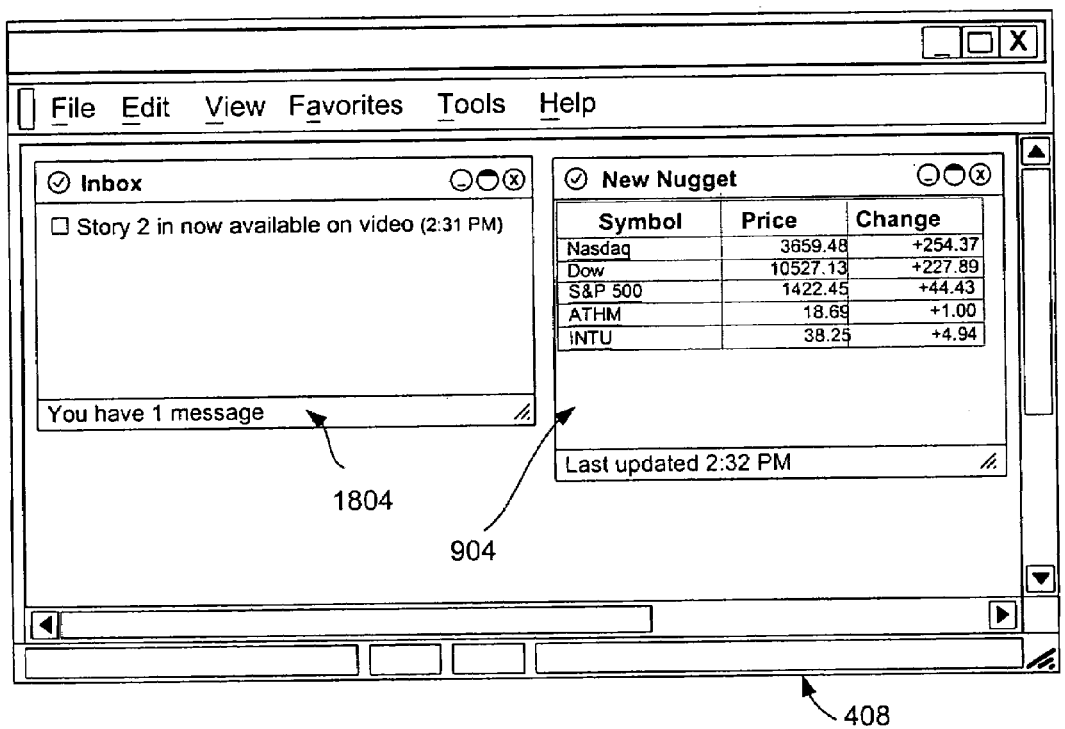
FIG. 18 is a screen shot of an embodiment of the portal page that shows active alerts.

The selection process is followed by the customization phase where the user edits the trigger condition as shown in FIG. 17a and the frequency at which the trigger condition will be tested as shown in FIG. 17b. Numerous condition types may be provided to the user, such as (not) equal to, less/more than a specified value, changes, increases/decreases by an amount, increases/decreases by a percentage, etc. In this example, once the condition has fired, it has been added as a message to the user's portal inbox 1804 shown in FIG. 18. Other notification UIs are possible (e.g., a popup window, an email message, an instant message, etc.).

Other alerts may be selected from other Web sites and set up in a similar fashion to that described above. All alerts, once triggered, can be treated similarly and displayed in the user's inbox 1804, so that all the various alerts are aggregated into one presentation in this embodiment.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

In light of the above description, a number of advantages of the present invention are readily apparent. For example, the selection control allows quickly selecting hierarchical information. Further, triggering events can be conditioned on the selected hierarchical information once selected.

A number of variations and modifications of the invention can also be used. For example, the selection control can be added to any program or operating system to allow selection of hierarchical information, such as the registry editor in Microsoft™ Windows.

While the principles of the invention have been described above in connection with specific apparatuses and methods, it is to be clearly understood that this description is made only by way of example and not as limitation on the scope of the invention.

What is claimed is:

1. A method for selecting hierarchical information with a computer system user interface, the method comprising steps of:
   recognizing selection of an element in a hierarchy, wherein the element defines a highlighted selection area on a screen;
   determining a plurality of ancestor elements for the element, wherein the plurality comprise a hierarchical progression of ancestor elements;
   providing a selection control displayed on the screen for the computer system user interface, wherein,
      a plurality of control-elements on the selection control each correspond directly to a different ancestor element of the plurality of ancestor elements;
      the selection control is configured to allow a user to choose a control-element of the plurality to thereby select the corresponding ancestor element; and
      the selection control is distinct from the highlighted selection area on the screen;
   recognizing manipulation of the selection control to choose the control-element; and
   selecting the corresponding ancestor element in response to the second-listed recognizing step.

2. The method for selecting hierarchical information with the computer system user interface as recited in claim 1, further comprising steps of:
   associating a trigger with content for the unit; and
   notifying a user when the content changes and the trigger occurs, wherein the notification comprises a message.

3. The method for selecting hierarchical information with the computer system user interface as recited in claim 1, wherein the selecting step comprises a step of selecting all descendent elements for the selected ancestor element.

4. The method for selecting hierarchical information with the computer system user interface as recited in claim 1, wherein the selection control allows selecting a plurality of sibling elements related to one of the element and the plurality of ancestor elements.

5. The method for selecting hierarchical information with the computer system user interface as recited in claim 1, wherein:
   the providing step comprises a step of providing a plurality of sibling elements related to at least one of the element and the plurality of ancestor elements; and
   the control allows selecting a path through the plurality of sibling elements and plurality of ancestor elements wherein crossed elements and their respective descendent elements are selected.

6. The method for selecting hierarchical information with the computer system user interface as recited in claim 1, wherein the hierarchy is derived from an hypertext markup language (HTML) page.

7. The method for selecting hierarchical information with the computer system user interface as recited in claim 1, further comprising a step of building a document object model from an HTML page.

8. The method for selecting hierarchical information with the computer system user interface as recited in claim 1, wherein the providing step comprises steps of:
   providing a range of ancestor elements of the element along a sliding scale; and
   providing a user-manipulatable slider that indicates a selected ancestor element in the range of ancestor elements.

9. The method for selecting hierarchical information with the computer system user interface as recited in claim 1, wherein the hierarchy represents one of:
   a software program with nesting;
   a HTML file;
   an extensible markup language (XML) document; and
   an organization chart.

10. The method for selecting hierarchical information with the computer system user interface as recited in claim 1, wherein the second-listed recognizing step comprises steps of at least one of:
    recognizing selection of one of the plurality of ancestor elements in the hierarchy; and
    recognizing selection of a sibling element in the hierarchy.

11. The method for selecting hierarchical information with the computer system user interface as recited in claim 1, wherein the control comprises a slider control movable along a sliding scale, and different increments of the sliding scale comprise different control-elements.

12. The method for selecting hierarchical information with the computer system user interface as recited in claim 1, wherein the control comprises two or four soft buttons.

13. The method for selecting hierarchical information with the computer system user interface as recited in claim 1, wherein:
   the control comprises a first and a second degrees of freedom,
   a first degree navigates ancestors and descendants of the element, and
   the second degree navigates among siblings of the element.

14. The method for selecting hierarchical information with the computer system user interface as recited in claim 1, wherein:
   the control comprises a slider control movable along a sliding scale, and
   the sliding scale is demarked with characters that comprise the selected ancestor element.

15. A method for selecting hypertext markup language (HTML) information with a computer system user interface, the method comprising steps of:
   receiving an HTML file from a server wherein the HTML file has a hierarchy;
   rendering an HTML web page corresponding to the HTML file;
   recognizing selection of an element in the hierarchy, wherein the element defines a highlighted selection area on a screen and the element has a hierarchical progression of ancestor elements;
   recognizing manipulation of a selection control to choose a control-element among a plurality of control-elements on the selection control, wherein,
      the plurality of control-elements each correspond directly to a different ancestor element of the progression of ancestor elements;
      the selection control is displayed on the screen for the computer system user interface; and
      the selection control is distinct from the highlighted selection area on the screen; and
   selecting, in response to the second-listed recognizing step, the ancestor elements corresponding to the control-element.

16. The method for selecting HTML information with the computer system user interface as recited in claim 15, further comprising a step of determining the hierarchy for the HTML file.

17. The method for selecting HTML information with the computer system user interface as recited in claim 15, wherein the rendering step comprises a step of rendering the HTML web page corresponding to the HTML file without visible modification.

18. The method for selecting HTML information with the computer system user interface as recited in claim 15, wherein the selecting step comprises selecting at least two items chosen from the element, the plurality of ancestor elements and a sibling element.

19. The method for selecting HTML information with the computer system user interface as recited in claim 15, receiving a triggering condition that triggers an alert if content of the selected ancestor element changes to satisfy the triggering condition, wherein the alert comprises a message.

20. The method for selecting HTML information with the computer system user interface as recited in claim 15, further comprising a step of receiving a triggering condition from a user related to the element.

21. The method for selecting HTML information with the computer system user interface as recited in claim 15, further comprising steps of:
   producing a processed web page related to the HTML web page, wherein the producing step comprising steps of:
   deactivating active elements within the HTML web page, and
   embedding a selection script into the HTML web page, wherein the selection script provides the selection control.

22. A method for allowing selection of snippets from a web page, the method comprising steps of:
   producing a processed web page related to the web page, wherein the producing step comprising steps of:
      deactivating active elements within the web page, and
      embedding a selection script into the web page, wherein the selection script provides a selection control, which is displayed on a screen that also displays the processed web page;
   recognizing selection of an element in a hierarchy that is related to the processed web page, wherein the element defines a highlighted selection area on the screen and the highlighted selection area is distinct from the selection control;
   determining a plurality of ancestor elements for the element, wherein the plurality comprise a hierarchical progression of ancestor elements;
   recognizing manipulation of the selection control to choose a control-element among a plurality of control-elements on the selection control, wherein plurality of control-elements each correspond directly to a different ancestor element of the progression of ancestor elements; and
   selecting the corresponding ancestor element in response to the second-listed recognizing step.

23. The method for allowing selection of snippets from the web page as recited in claim 22, further comprising steps of:
   determining a plurality of probable snippets for the web page;
   adding functionality to the web page to allow selection of the plurality of probable snippets; and
   receiving input selecting one of the plurality of probable snippets.

24. The method for allowing selection of snippets from the web page as recited in claim 22, receiving an address for the web page by a semi-proxy.

25. The method for allowing selection of snippets from the web page as recited in claim 22, further comprising steps of:
   associating a trigger with content for the selected ancestor element; and
   notifying a user when the content changes and the trigger occurs, wherein the notification comprises a message.

26. The method for allowing selection of snippets from the web page as recited in claim 22, wherein the processed web page has no visual differences from the web page.

27. The method for allowing selection of snippets from the web page as recited in claim 22, wherein the determining step comprises a step of analyzing a document object model related to the processed web page.

28. A software product embodied on a computer-readable medium for selecting hierarchical information with a computer system user interface, the software product comprising code for:

recognizing selection of an element in a hierarchy, wherein the element defines a highlighted selection area on a screen;

determining a plurality of ancestor elements for the element, wherein the plurality comprise a hierarchical progression of ancestor elements;

providing a selection control displayed on the screen for the computer system user interface, wherein, a plurality of control-elements on the selection control each correspond directly to a different ancestor element of the plurality of ancestor elements;

the selection control is configured to allow a user to choose a control-element of the plurality to thereby select the corresponding ancestor element; and the selection control is distinct from the highlighted selection area on the screen;

recognizing manipulation of the selection control; and selecting the corresponding ancestor element in response to the second-listed recognizing step.

* * * * *

UNITED STATES PATENT AND TRADEMARK OFFICE
CERTIFICATE OF CORRECTION

| | | |
|---|---|---|
| PATENT NO. | : 7,085,994 B2 | Page 1 of 1 |
| APPLICATION NO. | : 09/862987 | |
| DATED | : August 1, 2006 | |
| INVENTOR(S) | : Yaniv Gvily | |

It is certified that error appears in the above-identified patent and that said Letters Patent is hereby corrected as shown below:

Column 13, line 42, delete "elements" and add --element-- after the word "ancestor".

Column 14, line 33, add --the-- after "wherein".

Signed and Sealed this

Seventeenth Day of October, 2006

JON W. DUDAS
*Director of the United States Patent and Trademark Office*